United States Patent [19]

Brussel

[11] 4,253,891
[45] Mar. 3, 1981

[54] PROCESS AND DEVICE FOR THE CHARGING, PRESSING AND REMOVING STACKED PACKS FROM A HEAT PRESS

[75] Inventor: Richard Brussel, Sulzfeld, Fed. Rep. of Germany

[73] Assignee: Maschinenfabrik J. Dieffenbacher GmbH & Co., Eppingen, Fed. Rep. of Germany

[21] Appl. No.: 46,910

[22] Filed: Jun. 8, 1979

[30] Foreign Application Priority Data

Jun. 8, 1978 [DE] Fed. Rep. of Germany ....... 2825206

[51] Int. Cl.³ .................... B30B 15/30; B30B 15/32
[52] U.S. Cl. ............................... 156/60; 100/35; 100/45; 100/215; 100/218; 156/538; 156/583.1; 271/3; 271/85; 271/194; 271/267; 414/752
[58] Field of Search .............. 156/60, 538, 583.1, 156/583.5; 100/35, 45, 196, 215, 218; 271/3, 84, 85, 194, 267, 268; 414/752; 198/835

[56] References Cited

U.S. PATENT DOCUMENTS

| | | | |
|---|---|---|---|
| 3,243,054 | 3/1966 | Petersen | 100/215 |
| 3,372,217 | 3/1968 | Paerels | 100/215 |
| 3,450,030 | 6/1969 | Hutz | 100/215 |
| 3,655,316 | 4/1972 | Husges | 100/218 |
| 3,807,549 | 4/1974 | Cowdery et al. | 198/835 |
| 3,888,359 | 6/1975 | Moline | 271/84 |
| 3,927,612 | 12/1975 | Feiz et al. | 100/215 |
| 3,977,535 | 8/1976 | Husges et al. | 156/538 |

FOREIGN PATENT DOCUMENTS 2637585  2/1978  Fed. Rep. of Germany .

Primary Examiner—Jerome W. Massie
Attorney, Agent, or Firm—Schwartz, Jeffery, Schwaab, Mack, Blumenthal & Koch

[57] ABSTRACT

An apparatus and process is provided for charging, pressing and removing laminated sheets from a heat press. An unpressed laminate is placed on a conveyor tray which is inserted into the heat press from one end as a suction carrier is inserted from the other. The suction carrier removes a pressed laminate as the conveyor tray positions one end of the laminate on the top of the suction carrier. A belt mechanism on the top of the suction carrier, together with the conveyor tray, assists in positioning the entire laminate on a lower hot plate of the heat press at substantially the same time. The suction carrier and conveyor tray are simultaneously removed from the heat press so that the pressing action can occur.

4 Claims, 4 Drawing Figures

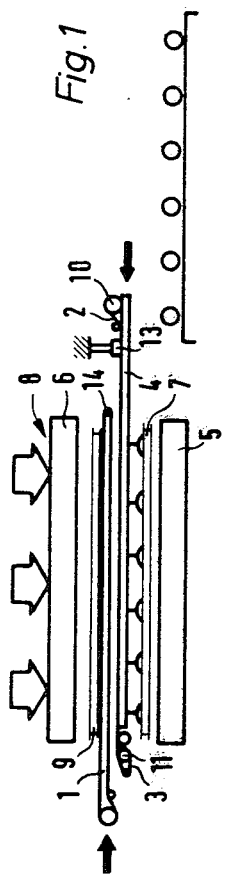
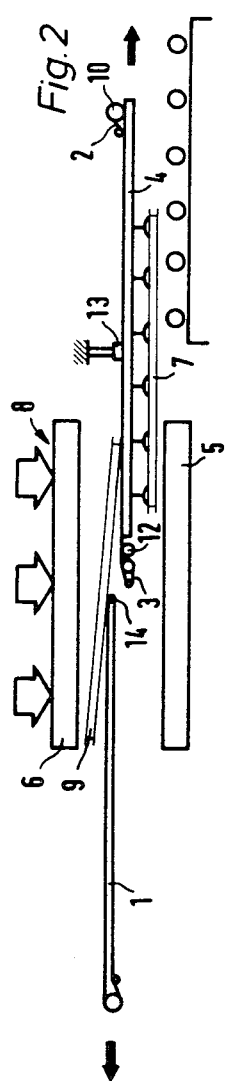
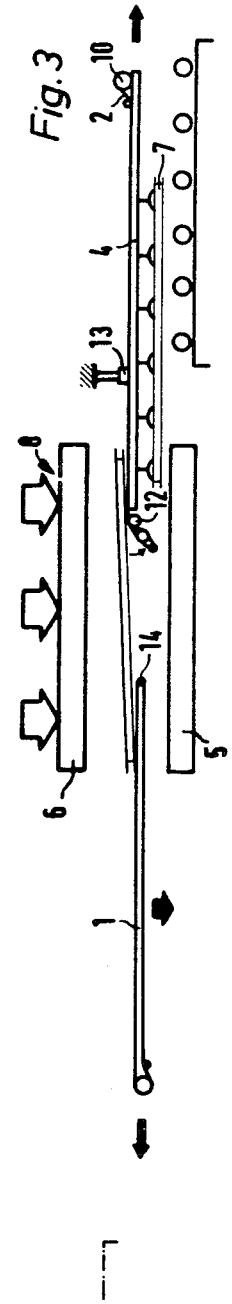
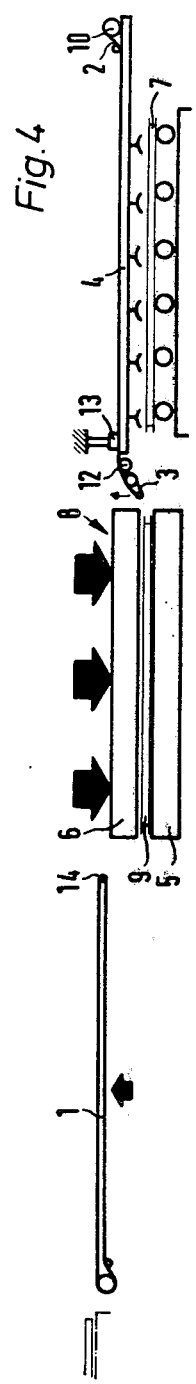

PROCESS AND DEVICE FOR THE CHARGING, PRESSING AND REMOVING STACKED PACKS FROM A HEAT PRESS

BACKGROUND OF THE INVENTION

1. Field of the Invention

The invention concerns a process for the charging, pressing and removing a stacked pack in a heat press, wherein the pack includes on both the top and bottom of a carrier sheet, of particle board, plywood plates, fiber boards and the like, layers of protective sheeting, and wherein the stacked pack is charged on a conveyor tray from the inlet end in a heat press, pressed by the application of pressure and heat and removed from the discharge end of the press by means of a suction car.

The invention further concerns a preferred device for the embodiment of the process according to the invention.

2. Background of the Invention

In keeping with the state of the art, stacked packs, generally comprising plates of a wood material and protective layers applied to both sides, are pressed in heat presses at temperatures to 200 degrees C. and pressures to 50 kg/cm$^2$.

The individual layers and the carrier are assembled outside the press by means of stacking tools and placed on a transport device in the form of a conveyor tray for charging a heat press. During the placing of the stacked pack in the heat press, the conveyor tray is withdrawn in the longitudinal direction, whereby initially the front end of the stacked pack is rollingly deposited on a lower hot plate, while the conveyor is rolling off. After the conveyor tray has run out completely, the rear end also drops off, and only then will the entire surface of the pack be in contact with the plate.

A disadvantage in the process resides in the fact that the stacked pack remains for a relatively long period of time on the lower hot plate, unevenly in time, before the press closes and pressure can develop. As a result of contact with the hot surface of the lower hot plate, the resin begins to foam and to harden. Without the effect of pressure, however, the surface desired cannot form.

Another disadvantage of this method is that the contact time in relation to the entire surface, due to the uneven deposition of the lower layers on the hot plate from front to rear, varies greatly. Because of the uneven thermal exposure, therefore, surfaces of varying quality with respect to appearance and hardening are often produced.

DT-AS No. 19 64 062 discloses a process whereby the above-mentioned disadvantages are avoided by the fact that the goods to be pressed are placed by the carrying device initially on a plurality of depositing arms after entering the press, which then are run out transversely in the longitudinal direction of the press, whereby the stack is deposited on the lower hot plate.

The device for the execution of the process consists of an arrangement wherein within the frame of the press on both sides a plurality of depositing arms are provided, which are supported by means of drive and/or guide rolls so that they may be run out transversely from the range of said press in the longitudinal direction of the press.

An object of the present invention is, to provide a process and a device which reduces the time between the placing of the stacked pack on a lower hot plate and the closing of the press. The stacked pack is simultaneously deposited on the lower hot plate so that the entire surface of the bottom side of the pack contacts the hot plate at approximately the same time.

However, a disadvantage of the process is that the transport device can enter the press only after a suction car has accepted the finished pack and runs out of the range of the press. This represents valuable seconds within which the overall cycle time appears as an increase in the production cost of a stacked pack.

A further disadvantage consists in the fact that the device for the embodiment of the process comprises numerous individual parts, is of complex design and expensive to produce.

It is the object of the invention to provide a process whereby the transport devices may enter and leave the range of the press rapidly, in order to shorten the work cycle.

The process according to the invention has the advantage, compared with the above-mentioned state of the art that the work cycle—and thus the time and cost for producing a laminated pack—is shortened by the simultaneous charging and discharging of a new and a finished stack pack so that the result is a reduction in the cost of production.

Other advantages and objects of the invention will become more apparent from the following detailed description and accompanying drawings, wherein:

FIG. 1 is a side view of the device according to the invention schematically illustrated with the conveyor tray and suction car in the press above each other, FIG. 2 the device according to FIG. 1 during the outward travel of the two transport devices at the moment of the attachment of the laminated pack to the suction car, FIG. 3 the device according to FIG. 1 preparing to deposit the stacked pack onto the lower plate of the press and FIG. 4 the device during the pressing of the stacked pack.

According to the process of the invention, the device shown in FIGS. 1 to 4 charges, presses and discharges laminated goods 7 and 9. The goods comprise top and bottom laminating materials, such as hardenable synthetic resin film, paper impregnated with synthetic resins, and the like, and a carrier plate of particle board or fiber board. The stacked pack 9 is introduced between a pair of hot plates 5 and 6 of a heat press 8 by means of a transport device in the form of a conveyor tray 1 capable of entering and leaving the press.

According to the invention, a suction car 4 enters the press simultaneously with and below the conveyor tray 1 and receives the finished laminated pack 7. For the simultaneous deposition of both the front ends and the full surface of the newly introduced stacked pack 9, the suction car 4 is equipped with a roll-off conveyor belt 2, driven in the forward and in the reverse directions by means of take-on and take-off rolls 10 and 12, and a reversing roll 11. The deposition of the stacked pack 9 is effected by the fact that both transport devices 1 and 4 move out of the press range at the same velocity, while the belt of the conveyor tray 1 is being driven in order to maintain the press position, already attained, of the pack, within the press. Whenever the conveyor tray 1 with its depositing end 14, as shown in FIG. 2, passes over the center of the pressing area, the front of the stacked pack 9 drops onto the roll-off belt 2 of the suction car 4. The roll-off belt 2 is then retained in position by the holding device 13, preferably by means of a suction ledge, in order to immobilize the stacked pack 9 in the pressing position. During the displacement of the suction car 4, the take-off roll 10 must uncoil the roll-off belt 2, and it must be taken up by the take-up roll 12. During the run-out, the conveyor tray 1 again descends to the charging plane of the laying station. In order to maintain the stacked pack 9 in the horizontal position in spite of this, the front side of said pack now slides over the pivoted edge 3 of the suction car, which is now in an inclined position. Upon leaving the pressing area, the two transport devices 1 and 4 release the stacked pack simultaneously so that it drops with its entire surface on the lower press plate 5.

As shown in FIG. 4, the suction car 4 deposits the laminated pack 7 for further transportation, and the conveyor tray 1 is ready in its initial position to accept a new stacked pack 9'. The above-described process of the invention one run-in period and one run-out period of the transport devices 1 and 4.

While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

I claim:

1. A process for charging, pressing and removing laminated sheets comprising:
   (a) providing a carrier sheet having a top and a bottom,
   (b) placing on the top and bottom a protective sheet forming an unpressed laminate,
   (c) placing the unpressed laminate on a conveying means,
   (d) moving the conveying means into an open heat press, the heat press having upper and lower hot plates,
   (e) moving a suction means into the open heat press,
   (f) the conveying means being initially offset in height from the suction means,
   (g) the suction means substantially simultaneously removing a pressed laminate from the heat press as the conveying means moves the unpressed laminate therein,
   (h) moving a portion of the unpressed laminate onto the suction means while a portion remains on the conveying means,
   (i) placing the unpressed laminate on the lower hot plate by substantially simultaneously removing the conveying means and the suction means from the heat press.

2. A process as defined in claim 1 including maintaining the unpressed laminate above the lower hot plate during the removal of the conveying and suction means in opposite directions.

3. A device for charging, pressing and discharging laminated sheets comprising:
   (a) a heat press,
   (b) a conveying means for charging the heat press,
   (c) a suction means for discharging the heat press,
   (d) said suction means having a pair of ends and an upper side and a conveyor belt thereon, said belt being drivable in two directions by means of a plurality of rolls, and
   (e) a holding means positioned on said suction means at one end thereof.

4. A device for charging, pressing and discharging laminated sheets comprising:
   (a) a heat press,
   (b) a conveying means for charging the heat press,
   (c) a suction means for discharging the heat press,
   (d) said suction means having a pair of ends and an upper side and a conveyor belt thereon, said belt being drivable in two directions by means of a plurality of rolls, one of said rolls being a reversing roll and being mounted on one end of said suction means and being pivotable thereon.

* * * * *